United States Patent [19]

Ernsting

[11] Patent Number: 4,883,681
[45] Date of Patent: Nov. 28, 1989

[54] PROCESS FOR PREPARING AN EDIBLE DISPERSION

[75] Inventor: Peter B. Ernsting, Delft, Netherlands

[73] Assignee: Lever Brothers Company, New York, N.Y.

[21] Appl. No.: 201,518

[22] Filed: Jun. 2, 1988

[30] Foreign Application Priority Data

Jun. 5, 1987 [GB] United Kingdom ............ 8713266

[51] Int. Cl.$^4$ ............................................. A23D 5/00
[52] U.S. Cl. .................................... 426/573; 426/602; 426/603; 426/656
[58] Field of Search ............... 426/602, 603, 656, 573

Primary Examiner—Donald E. Czaja
Assistant Examiner—Celine T. Callahan
Attorney, Agent, or Firm—Milton L. Honig

[57] ABSTRACT

An edible plastified dispersion having a continuous fat phase and a dispersed aqueous phase, in particular low-calorie spread, is prepared by a process that includes (i) cooling a constituted emulsion having a continuous aqueous phase and a dispersed fat phase and comprising essentially no solid fat, by passing it through a static heat exchanger to cause partial crystallization of fat, the emulsion leaving the heat exchanger as a dispersion having a continuous aqueous phase and containing crystallized fat, and (ii) feeding the dispersion from step (i) directly to means for imparting kinetic energy so as to invert the dispersion into a dispersion having a continuous fat phase and a dispersed aqueous phase. The use of scraped-surface heat exchangers can be dispensed with, without adverse effects on the product properties.

19 Claims, 1 Drawing Sheet

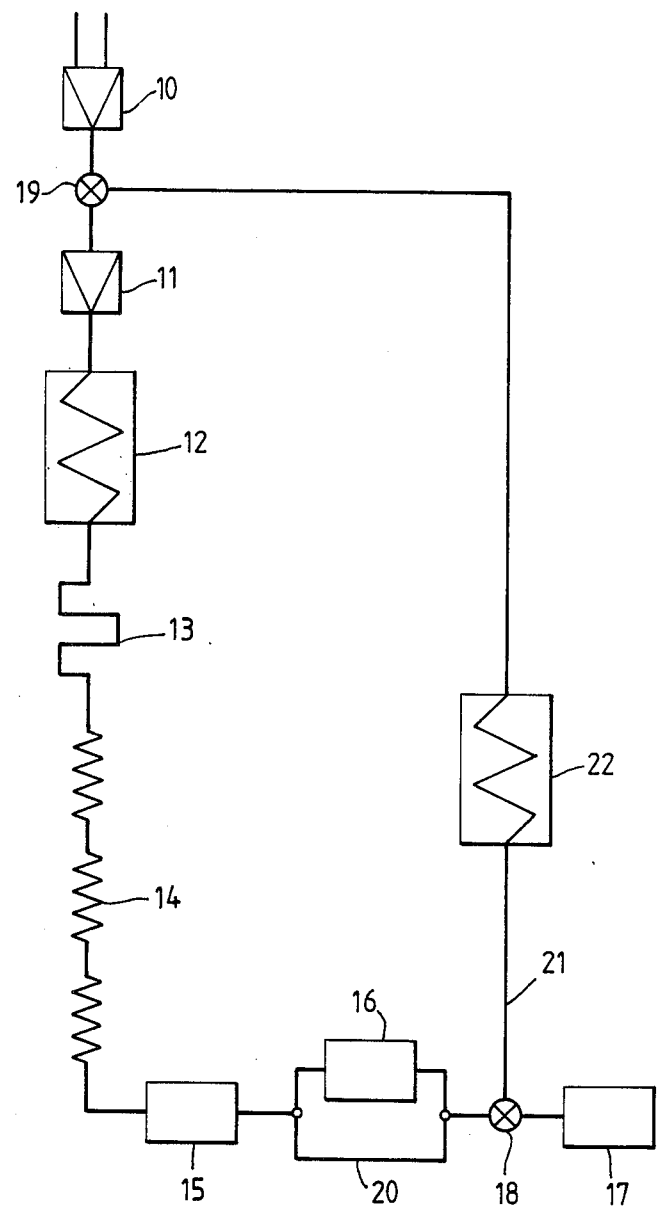

PROCESS FOR PREPARING AN EDIBLE DISPERSION

BACKGROUND OF THE INVENTION

1. Field of the Invention

The present invention relates to a process for preparing an edible plastified dispersion comprising a continuous fat phase and a dispersed aqueous phase, and to an apparatus for, carrying out such process.

2. The Related Art

Examples of edible plastified dispersions comprising a continuous fat phase and a dispersed aqueous phase are butter, margarine and similar products but having a lower fat content, which are often referred to as low-fat spreads. The continuous fat phase of such dispersions comprises both liquid oil and fat in the solid state. (The terms oil and fat are used interchangeably throughout this specification.)

GB No. 2 084 171 describes a process for making low-fat spread by preparing an o/w emulsion and passing it through a scraped-surface heat exchanger in which the emulsion is cooled and worked to bring about phase inversion and plastification. The specification further discloses a process wherein an o/w emulsion is prepared by emulsifying a fat phase and an aqueous phase in a C-unit rotating below a certain threshold value, the emulsion is chilled and sheared by passage through an A-unit and subsequently phase inversion is brought about by passage through another C-unit, but now rotated above a certain threshold value. The aqueous phase composition comprises protein, gelling agent and a viscosity-increasing agent.

It has now been found that the process for making edible plastified dispersions via phase inversion can be substantially improved. We have found a process that is much more economical than the conventional process. Nevertheless, the quality of the products obtained is at least as high as that of the conventionally prepared products, and can be even higher.

SUMMARY OF THE INVENTION

According to a first aspect, the present invention provides a continuous process for the preparation of an edible plastified dispersion having a continuous fat phase and a dispersed aqueous phase that includes:

(i) cooling a constituted emulsion having a continuous aqueous phase and a dispersed fat phase and comprising essentially no solid fat, by passing it through a static heat exchanger to cause partial crystallization of fat, the emulsion leaving the heat exchanger as a dispersion having a continuous aqueous phase and containing crystallized fat, and (ii) feeding the dispersion from step (i) directly to means for imparting kinetic energy so as to invert the dispersion into a dispersion having a continuous fat phase and a dispersed aqueous phase.

BRIEF DESCRIPTION OF THE DRAWING

A preferred embodiment of the present invention is illustrated in the sole FIGURE depicting the process and equipment in schematic form.

DETAILED DESCRIPTION

In this specification the term "phase inversion" is used in its strict meaning, i.e. the material present in the emulsion prior to the inversion is also contained essentially completely in the dispersion after the phase inversion has taken place. Consequently, the present process does not encompass processes such as occur in conventional butter-making, wherein the emulsion is turned into clumps with a continuous butterfat phase and phase-separated buttermilk that is drained off. However, the term "phase inversion" as used herein does not imply that all oil and fat necessarily ends up in the continuous phase. The end product may, for example, have an oil-in-water-in-oil structure. Such product can, for example, be obtained by using as starting material a coarse emulsion constituted of vegetable oil in milk. In such an emulsion, the size of the vegetable oil globules can, for example, suitably be on an average between 30 and 50$\mu$, whereas the average milkfat globule size in milk usually is between 3 and 6$\mu$.

Phase inversion may then be carried out so that a continuous fat phase is formed, mainly of vegetable oil, whereas a substantial part of the milkfat remains dispersed as small fat globules within the dispersed aqueous phase droplets.

In the present process, before the phase inversion, no scraped-surface cooling apparatus such as A-units are used. It has been found that, without adverse effect on the quality of the product obtained, the action of A-units or similar apparatus with respect to crystal nucleation and emulsification during the cooling can be dispensed with.

By a constituted emulsion is meant an emulsion which is prepared by admixing two or more different compositions. Examples of suitable constituted emulsions are compositions obtained by admixing vegetable fat and water, dairy cream and vegetable fat, butter and water, artificial cream and dairy cream, butter and halvarine (spread containing about 40% of fat). Of course, the above-mentioned constituted emulsions, if obtained in a fat-continuous form, must be made water-continuous before being subjected to cooling in step (i) of the present process. If, for example, the constituted emulsion formed by admixing butter and halvarine is fat-continuous, a water-continuous emulsion may be obtained by heating the emulsion while stirring. The term constituted emulsion as used throughout this application does not encompass ordinary dairy cream. Ordinary dairy cream is obtained by separation from cow's milk by a well-known traditional process.

The constituted emulsion is preferably prepared by admixing at least two different compositions, one comprising a continuous fat phase and the other comprising a continuous aqueous phase. The constituted emulsion preferably comprises vegetable fat; more preferably it comprises at least 25 wt. % and most preferably at least 50 wt. % of vegetable fat.

In this specification the term heat exchanger is used in its common meaning. It indicates apparatus through which, in normal operation, the material to be heated or cooled is passed in a continuous flow. A temperature gradient exists down the flow path in the material contained in the heat exchanger at a particular time. Thus, generally, the temperature of the material at different places down the flow path is different. Consequently, "heat exchanger" does not encompass holding vessels provided with cooling means as are commonly employed for physical ripening (i.e. maintaining a cream at a temperature sufficiently low to allow crystallization of fat to occur, typically at a temperature near 10° C., for a long time, typically for a period of 8 hours or longer). Nor does "heat exchanger" include series of such holding vessels as are for example used for physical ripening in semi-continuous butter-making processes.

By a "static heat exchanger" is meant a heat exchanger essentially without moving parts. For example, a cooling coil may be used. The static heat exchanger may be provided with static elements, e.g. pins, that cause mixing of the material passing through. For example, a static mixer provided with cooling means may be employed as static heat exchanger.

Preferably, the constituted emulsion prior to entrance into the static heat exchanger is an emulsion having an average fat globule size of at least $10\mu$. However, emulsions with smaller fat globule size, e.g. an emulsion comprising a substantial amount of dairy cream, may also be employed. The average fat globule size of the emulsion entering the static heat exchanger is more preferably $20-80\mu$, even more preferably $30-50\mu$. Emulsions having such average fat globule size can be obtained easily. The average dispersed phase globule size of constituted emulsions, whether of the w/o or the o/w type, that are used for making margarine or low fat spread is typically of such magnitude. It is an advantage of the present process that usually no fine homogenization is required, as would be the case if the emulsion was to be physically ripened and churned.

We have found that, even when processing coarse emulsions, which usually are not stable and separate into oil and aqueous layers when left to stand, the agitation as provided by e.g. A- and C-units can be dispensed with during the cooling over the entire temperature range from the essentially completely liquid emulsion to the undercooled system (see below) in which part of the fat has crystallized and which is ready to be inverted by imparting kinetic energy to it. No adverse effects on the properties of the end product are observed when omitting agitation during the cooling.

The initial investment costs as well as the operating costs, in particular the energy requirements, and the maintenance costs of static heat exchangers are much lower than those of dynamic heat exchangers such as A-units.

It has furthermore been found that the present process can be carried out using cooling media having temperatures not so low as those conventionally employed. With A-units, for example, commonly liquefied gas such as liquid ammonia, having a temperature of about $-30°$ C., is used as cooling medium. In the present process sufficient cooling can be achieved using for example ice-water. Thus, the equipment to provide for example liquid ammonia can be replaced with equipment for making cold water or ice-water, allowing further substantial savings to be obtained.

The static heat exchanger employed may consist of a single large unit, but to increase the flexibility of the production line it is preferred that the static heat exchanger should be composed of a series of smaller units, of which units one or more can then be by-passed if so desired. The units may all be the same or a number of differently constructed units may be combined. For example, the static heat exchanger may consist of a series of cooling coils. Alternatively, it may comprise several cooling coils and U-shaped tubular heat exchanger elements connected by means of pipes. Preferably a tubular heat exchanger, e.g. a cooling coil or a combination of tubular heat exchanger elements, is used as static heat exchanger.

According to the process of the present invention, the o/w emulsion entering the static heat exchanger should comprise essentially no solid fat. This can suitably be achieved for example by employing an emulsion that just leaves the pasteurization stage. The temperature of such an emulsion will be sufficiently high to ensure that the fat is molten and that consequently the emulsion contains essentially no solid fat. Alternatively, an emulsion in molten state can be made by heating an emulsion or by separately heating for example the fat and aqueous-phase compositions and emulsifying them at elevated temperature.

As will be described in more detail below, the cooled emulsion emerging from the static heat exchanger is in an undercooled state. The undercooled emulsion comprising crystallized fat, i.e. a dispersion, that leaves the static heat exchanger must still have a continuous aqueous phase. If premature phase inversion in the static heat exchanger were to occur, this would cause an increase of the pressure and would affect the properties of the resulting product. It could even lead to complete blockage of the production line. Premature phase inversion is, however, not likely to occur unless the fat content of the composition constituting the emulsion, i.e. the dispersed phase volume, is very high. In this case the process can be controlled by adjusting the throughput or the cooling on the heat exchanger or by choosing a static heat exchanger of different dimensions, e.g. of different length or cross-sectional area.

It is an advantage of the present process that premature phase inversion is unlikely to happen. If, for example, a low fat spread is produced on a production line comprising a series of A-units and C-units, because of the intense working premature phase inversion is more likely to happen. If it is, for example, intended to bring about the phase inversion in the third of those units, the place where inversion actually happens may shift to earlier stages in the line. Because of this, the inverted dispersion is subjected to more working than was intended, which is likely to result in too fine an aqueous phase dispersion. In particular this has an adverse effect on the organoleptic properties of the product. Since in the present process the risk of premature phase inversion occurring is substantially smaller, the present process allows better control of the properties of the end product. Another important factor is that certain ingredients that may be employed in, for example, low fat spreads, e.g. starch, are sensitive to working. With the present process mechanical breakdown of such ingredients can be avoided, or at least the risk of this happening can be substantially reduced.

Preferably, a closed flow path is provided by the means including the static heat exchanger and the means for imparting kinetic energy to the dispersion. By this is meant that, essentially, the material being processed and flowing through the closed flow path, e.g. through the heat exchanger, the phase-inversion unit or any pipe connecting the two, should preferably not be in direct contact with the outside air. This is desirable to prevent contamination of the product, and especially to allow the process to be carried out at elevated pressure. The heat exchanger may be connected to the phase-inversion unit directly, or for example by means of a pipe.

Crystallization of fat normally is a relatively slow process. If the emulsion is cooled down to a temperature below the temperature at which fat crystallization begins, by passing it through a heat exchanger, i.e. in a relatively short period of time, then the dispersion leaving the heat exchanger is usually in an undercooled state, i.e. the solid fat content is less than the equilibrium solid fat content at that temperature (and, usually, at least part of the crystallized fat occurs in a meta-stable crystal form, which crystals will transform to a more stable form). We believe that the relatively low solid fat content of the undercooled dispersion leaving a heat exchanger, as compared with a physically ripened system in which the solid fat content is close to the equilibrium value, is one of the reasons why no separation of excess aqueous phase occurs in, inter alia, the present phase inversion process, whereas it does occur in butter-making and the like.

The undercooled emulsion contains some solid fat and these crystals are necessary to stabilize the aqueous droplets after inversion has occurred. On the other hand, generally, the solid fat content is relatively low, and consequently the amount of liquid oil is still relatively high. Because of this, it is relatively easy to form a continuous oil phase in which to incorporate a relatively large amount of aqueous phase. Because the system is still undercooled, crystallization continues during and after the inversion which stabilizes the inverted system obtained.

Especially if the fat is a fat having a relatively high solids content at lower temperatures, e.g. butterfat, the difference in solid fat content of a physically ripened emulsion and an undercooled emulsion obtained by cooling down the emulsion to the same temperature by passing it through a heat exchanger, usually is quite substantial.

Accordingly, the phase inversion should be brought about while the emulsion is in the undercooled state. To achieve this it is desirable to carry out the process in a continuous manner, and to pass the emulsion through a heat exchanger and into the unit that brings about the phase inversion. Consequently, it should preferably be possible to apply pressure, and, therefore, the flow path through the heat exchanger and the means to bring about the phase inversion should preferably be (part of) a closed flow path.

As will be further elucidated below, the preferred compositions used in the present process have viscosities, especially at the lower temperature stage of the process, which are appreciably higher than the viscosity of for example dairy cream under similar conditions. (The viscosity of a dairy cream containing 40% fat at a temperature of 20° C. and a shear rate of 100 s$^{-1}$, typically is about 40 mPa.s. The viscosity of the aqueous phase of dairy cream typically is about 1-2 mPa.s at 20° C. and 100 s$^{-1}$). To allow compositions with high viscosity to be processed, the equipment employed should be sufficiently robust to withstand pressures substantially above atmospheric, for instance pressures of 10 bar or higher. Typically, the pressure drop across the production line in the present process, carried out on factory scale, is similar to that occurring in commonly used processes for making for example margarine or halvarine, for example in the order of about 20 to 60 bar, commonly about 30 to 50 bar.

For, inter alia, organoleptic reasons, it is desirable for the end product to comprise gelling agent and/or thickening agent. Gelling agent is preferably present in a concentration high enough to cause the aqueous phase to gel. Many gelling agents have short gelling times and gelation may begin during the process. The presence of such ingredients, especially if gelation takes place, may cause a substantial increase of the viscosity.

Cooling of viscous substances, and particularly of gelling materials, is normally done in a dynamic heat exchanger, usually in a scraped-surface heat exchanger. This is done to prevent adherence of chilled material to the wall, which would cause an increase of pressure if the throughput is kept constant by means of a positive displacement pump. The layer that would be built up on the heat-exchanger wall would act as insulation and would affect the cooling of the still flowing material. Ultimately, the material leaving the heat exchanger would be insufficiently cooled and the pressure on the line would become dangerously high.

We have found that, even in the presence of high concentrations of viscosity-increasing substances, in the present process these problems do not occur, and the use of a dynamic heat exchanger to cool the emulsion from the liquid state down to the temperature at which phase inversion may be effected, can be dispensed with. We do not wish to be bound by theory, but we believe that the absence of these problems can be ascribed to shear-thinning. When the emulsion is passed through the static heat exchanger, any shear forces occurring in the flow are highest near the wall of the heat exchanger. We believe that shear-thinning occurs, causing the formation of a thin layer of material adjacent to the wall that has a low apparent viscosity, i.e. the opposite of the feared build-up of a layer of viscous and gelled material on the chilled heat-exchanger wall. The low apparent viscosity layer, we believe, prevents the pressure from increasing (as would occur if fouling took place) and contributes to the heat transfer, thus allowing homogeneous cooling of the emulsion flow to be obtained.

The average linear velocity of the flow of material in the static heat exchanger, i.e. the ratio of the volume flow and the cross-sectional area, is preferably from 0.2 to 2.0 m/s, more preferably from 0.5 to 1.0 m/s. At lower average linear velocity values, we believe, no substantial shear thinning occurs and the risk of fouling on the chilled heat exchanger wall and of an increase of the pressure drop across the production line occurring increases. On the other hand, very high linear velocity values are undesirable because they cause the investment cost to become unnecessarily high. Very long heat exchangers would have to be used to be able to apply such high linear velocity values. Moreover, the pressure drop across the heat exchanger would become very high.

The emulsion preferably comprises gelling agent. Suitable gelling agents are, for example, carrageenan, gelatin and gelling starch derivatives. Mixtures of gelling agents may be used as well. Preferably, gelling agent is employed in a concentration sufficiently high to cause the aqueous phase to gel. The concentration of gelling agent required to cause gelation depends, inter alia, on the gelling agent. For example, 0.5-2% carrageenan, calculated on the weight of the aqueous phase, will usually cause gelation. When using, for example, gelling starch derivative or calcium caseinate as gelling agent, substantially higher concentrations are normally required, e.g. in the range of about 7-20 wt. % or even higher.

The emulsion preferably comprises thickening agent. Suitable thickening agents are, for example, non-gelling starch or starch derivatives and xanthan gum.

To allow the o/w emulsion to be cooled sufficiently deep without premature phase inversion occurring, and also to obtain good organoleptic properties of the end product, it is preferred that the emulsion contains protein, e.g. 0.05–10 wt. %. Preferably, the protein content of the emulsion is 0.2–5% by weight.

The aqueous phase composition, i.e. the composition that constitutes or that is to constitute the aqueous phase of the emulsion, preferably has a viscosity of from 10 to 1000 mPas at 100 s$^{-1}$ and 20° C., more preferably it has a viscosity of from 20 to 500 mPas at 100 s$^{-1}$ and 20° C.

In a preferred embodiment of the present process a relatively high viscosity of the aqueous phase is combined with a relatively high solid fat content of the fat phase as indicated by the N-value at 10° C., and vice versa a low viscosity is preferably combined with a low N-value at 10° C. The products according to this preferred embodiment appear to be very stable and have a very good oral response. Such an N-value may be determined by means of NMR, using the method described in Fette, Seifen, Anstrichmittel, 80 (1978), 180–186. Thus, in the present process, preferably the N-value of the fat phase composition at 10° C., represented as $N_{10}$, and the viscosity (mPas) of the aqueous phase composition at a shear rate of 100 s$^{-1}$ and at a temperature of 20° C., represented as V, meet the following requirements:

$V \leq 24 \times N_{10} + 20$
$V \geq 7 \times N_{10} - 190$
$10 \leq N_{10} \leq 55$.

The emulsion is preferably cooled down in the static heat exchanger in step (i) of the present process to a temperature between 0° C. and 20° C., more preferably to a temperature between 3° C. and 15° C. The dispersion thereby obtained is then passed directly into a unit in which kinetic energy is imparted to it to bring about the phase inversion. (The means to impart kinetic energy to bring about the phase inversion can conveniently be referred to as a "phase inversion unit". This terminology is used here, although for example a pressure valve, which can be used to impart kinetic energy to bring about the phase inversion, would, in a different context, usually not be referred to as a "unit".) The optimum temperature for the dispersion to have when leaving the heat exchanger and entering the phase-inversion unit depends to some extent on the composition employed. To obtain a stable dispersion leaving the phase-inversion unit, it is desirable for the dispersion to contain at that stage at least 0.5% by weight of solid fat. Therefore, the emulsion is preferably cooled in the heat exchanger, in dependence on the fat composition, such that crystal nuclei are formed and crystallization proceeds in the heat exchanger and the phase-inversion unit to an extent such that the dispersion emerging from that phase-inversion unit contains 0.5 wt. % or more, more preferably 2–20 wt. % of solid fat.

On the other hand, if the emulsion is cooled to lower temperatures in the static heat exchanger, the viscosity of the aqueous phase increases. The solid fat content of the fat phase increases as well, thereby reducing the phase volume ratio of liquid oil and aqueous phase. Both the increase of the aqueous phase viscosity and, once a sufficient amount of solid fat has formed to stabilize the aqueous phase droplets, the further increase of solid fat content make it more difficult to invert the o/w dispersion to a w/o dispersion. Under such circumstances, we have found, it is necessary to increase the kinetic energy imparted to the dispersion to cause it to invert.

Thus, deep cooling will contribute to the stability of the inverted dispersion but at the same time usually makes it more difficult to achieve that inversion. Under practical circumstances the optimal temperature for the dispersion to have when entering the phase-inversion unit usually lies between about 3° C. and 15° C., depending on the precise composition and process conditions used.

We have found that, to obtain an end product of excellent quality, it is desirable to avoid the situation wherein the phase inversion occurs almost spontaneously, i.e. not induced by imparted kinetic energy. This can be done, for example, by causing a decrease in the phase volume ratio of liquid oil and aqueous phase of the dispersion to be inverted, for example by increasing the aqueous phase content and decreasing the fat phase content of the overall composition. Preferably however, spontaneous inversion is avoided by cooling the dispersion to a somewhat lower temperature before entrance into the phase-inversion unit. As mentioned above, this latter measure will cause the aqueous phase viscosity to increase, which makes obtaining the inversion more difficult. When taking such measures to stay clear of the situation in which the phase inversion may occur almost spontaneously, in view of desired properties of the end product, the kinetic energy that must be imparted to the undercooled dispersion to invert it, increases. This may mean, for example, that for a given composition the end properties can be improved by reducing the throughput. The reduced heat load and the increased residence time in the heat exchanger will cause the undercooled dispersion leaving it to have a lower temperature, thus making phase inversion more difficult as described above. The increased kinetic energy required to effect inversion can be provided at the same time by the increased residence time in the phase-inversion unit, for example if an A- or C-unit is employed as phase-inversion unit.

Preferably, in the phase-inversion step (ii) of the present process, the kinetic energy imparted to the dispersion is at least 5 kJ/kg. The kinetic energy imparted to the dispersion is more preferably 10–150 kJ/kg, even more preferably 15–75 kJ/kg.

The kinetic energy may be imparted to the dispersion for example by passing it through a pressure valve or a static mixer. Preferably, the kinetic energy is imparted to the dispersion by subjecting it to a working treatment.

As phase-inversion unit to subject the dispersion to the working treatment that brings about the phase inversion, for example a dynamic mixer, e.g. an A-unit can be used, which need not be cooled for this purpose. Preferably, as phase-inversion unit a homogenisator comprising a rotor and a stator is applied, more preferably a standard stirred crystallizer, e.g. C-unit, operated at relatively high rotor speed is employed. Owing to the heat of crystallization liberated and the mechanical energy put into the composition, its temperature tends to rise during the passage through the phase-inversion unit. The extent to which this occurs may, inter alia, be adjusted by varying the volume of the C-unit or the rotor speed at which it is operated. Preferably, the phase-inversion treatment is carried out such that after the treatment the inverted dispersion has a temperature between 10° and 23° C. To achieve this, e.g. the C-unit may be provided with a cooling jacket, but this is not normally necessary, nor desirable.

The dispersion leaving the phase-inversion unit may, prior to packing, be subjected to a further working and/or cooling treatment, for example by passing it through an A-unit or, preferably, a C-unit, optionally provided with a cooling jacket. Further cooling may for example be desirable to obtain a low packing temperature. Alternatively, the dispersion leaving the phase-inversion unit may be packed without further treatment.

The emulsion preparation preceding step (i) of the process can be carried out in any known way. The emulsion can, for example, be prepared in a stirred pre-mix vessel or by means of a proportioning pump. The aqueous phase and fat phase compositions are suitably heated, before bringing them together, to a temperature at which they are both essentially liquid, e.g. to a temperature between about 40° and 60° C. or even higher.

If, somehow, the bringing together of the aqueous phase and fat phase compositions by means of e.g. a proportioning pump does not result in an overall composition constituting an emulsion having a continuous aqueous phase and a dispersed fat phase, then such emulsion is normally automatically formed in subsequent stages of the process, prior to the entrance into the static heat exchanger of step (i) of the process, e.g. upon passage through a high-pressure positive displacement pump and/or a pasteurization stage. Especially for the purpose of preparing the emulsion, an additional mixer may be included in the production line, but such measures are not normally necessary. Usually, the aqueous phase and fat phase compositions are brought together via a premix or via a proportioning pump and, usually, this results in the formation of an emulsion having a continuous aqueous phase and a dispersed fat phase.

The emulsion is suitably prepared using 20–90 wt. % of aqueous phase composition and 80–10 wt. % of fat phase composition. Preferably, the emulsion comprises from 30 to 88% by weight of aqueous phase and from 70 to 12% by weight of fat phase. Even more preferably it comprises from 35 to 85 wt. % of aqueous phase and from 65 to 15 wt. % of fat phase. Any protein and gelling and thickening agents, referred to above, can conveniently be introduced into the emulsion via the aqueous phase composition. The compositions of the aqueous phase and the fat phase employed in the present process are not critical. They may contain, in addition to the preferred materials described above, ingredients and additives such as emulsifiers, salt and other taste and flavour compounds, preservatives, colouring matter, vitamins, etc.

The present process is particularly suitable for the production of relatively soft products, which spread easily. Such relatively soft products are normally packed in tubs, as contrasted with products packed in wrappers. The present process thus is preferably applied in the production of a product which, upon packaging, has a hardness, as represented by the C-value, of less than 250. The C-value of the product may be measured by means of a cone penetrometer as described in J.A.O.C.S. 36 (1959), 345–348.

As fat, any edible triglyceride fat or oil can be used, whether or not hydrogenated and/or interesterified, or mixtures thereof having solid fat contents, at temperatures in the range of about 5°–35° C., essentially similar to those conventionally employed for making edible dispersions such as margarine, low-calorie spreads and the like. As fat may also be employed, as a partial or complete replacement for the triglyceride oil, edible fat-like substances such as for example poly fatty acid ester of sucrose. Preferably, however, the fat employed consists essentially of triglycerides.

Suitably, the aqueous phase composition is pasteurized, either before or after emulsification with the fat phase, but before cooling the emulsion in the static heat exchanger. Preferably, the pasteurization is carried out on the composition constituting the emulsion by heating it prior to the cooling of step (i), by passing the composition through a static mixer provided with heating means, the composition being heated to a temperature sufficiently high, and being kept at such temperature sufficiently long for it to be pasteurized. Carrying out the pasteurization with the use of a heated static mixer allows uniform heating of the composition to be obtained. The use of the static mixer may further contribute to the emulsification. Thus, if the composition entering the pasteurization stage is not yet in the form of a water-continuous emulsion having a dispersed fat phase, then the passage through the static mixer in this pasteurization stage may cause such emulsion to be formed.

To prevent having to stop the entire production line when the packing machine breaks down, it is desirable to have rework facilities. A closed rework system, wherein the product ready for packing but temporarily not being handled by the packing machine, is melted and fed back to the beginning of the production line, to be processed again, is preferred. To keep the rework line ready for operation in case the packing machine breaks down, in which case the entire product stream has to be passed through it, a small portion of the product stream, e.g. 5–10% thereof, is continuously passed through the rework line.

In the present process, preferably, part of the dispersion available for packing of the present process is passed through a closed rework path which includes a static mixer provided with heating means, wherein the dispersion is heated to cause melting of the dispersion and inversion thereof into an emulsion having a continuous aqueous phase and a dispersed fat phase. Temporarily, all of the dispersion may be reworked, for example, in case of a complete break-down of the packaging machine.

The use of a heated static mixer in the rework line has the advantage that it allows the dispersion to be heated in a homogeneous manner, thereby facilitating complete melting and ready phase inversion and preventing local overheating and consequential deterioration of e.g. protein from occurring.

According to a second aspect, the present invention provides an apparatus for carrying out the present process, which comprises means that provide an inlet and an outlet and a closed flow path between them, which means include
 (i) means for preparing an emulsion having a continuous aqueous phase and a dispersed fat phase,
 (ii) downstream thereof a static heat exchanger provided with cooling means,
 (iii) connected to said heat exchanger, optionally by means of a pipe, means to impart kinetic energy to the cooled emulsion to invert it into a dispersion having a continuous fat phase and a dispersed aqueous phase, and
 (iv) downstream thereof, i.e. of the means to impart kinetic energy, a packing machine.

Optionally, the means that provide the closed flow path include means to subject the dispersion to further working and/or cooling, which latter means may be placed between the means to impart kinetic energy to the cooled emulsion to invert it, i.e. the so-called phase inversion unit, and the packing machine.

The means to impart kinetic energy to the cooled emulsion, preferably are means to subject it to a working treatment.

The static heat exchanger preferably is a tubular heat exchanger, e.g. a cooling coil or a combination of tubular heat exchanger elements.

To allow pasteurization, the means that provide a closed flow path preferably include, upstream of the static heat exchanger, means including a static mixer provided with heating means to heat the composition constituting the emulsion to a temperature sufficiently high and to keep the composition at such temperature sufficiently long for it to be pasteurized.

The apparatus further preferably includes means that provide a closed rework path, which include a static mixer provided with heating means, which closed rework path is connected to the closed flow path between the means to impart kinetic energy to the cooled emulsion and the packing machine, and upstream of the static heat exchanger.

The apparatus includes a proportioning pump (10), providing an inlet, followed by a high-pressure positive displacement pump (11), a static mixer (12) with a jacket through which a heating medium, e.g. hot water, can be passed, a pipe (13) to provide for a sufficiently long residence time, a static heat exchanger in the form of a cooling coil (14) composed of several units, one or more of which are provided with by-passes (not shown), a C-unit (15) to be employed as phase inversion unit, a further C-unit (16) containing a jacket through which a cooling medium can be passed and provided with a by-pass (20) and a packing machine (17). The units are connected via pipes and provide a closed flow path from the proportioning pump (10) to the packing machine (17), substantially preventing contact of the product stream with the outside air, and thus preventing contamination of the pasteurized product, and further allowing the process to be carried out at elevated pressure. The packing machine (17) provides the outlet of the production line. A closed rework line (21) is connected to the closed flow path by means of valves (18) and (19). The rework line (21) includes a static mixer (22) provided with a jacket through which a heating medium is passed. The pipes included in the rework line (21), in particular the pipe between valve (18) and the static mixer (22), are preferably also provided with a heating jacket or other heating means.

The aqueous phase and fat phase compositions, both heated to e.g. 50° C., enter the pump (10) and are thereby emulsified in appropriate proportions to form an o/w emulsion. The emulsion then passes through the high-pressure pump (11) and enters the static mixer (12) in which it is heated to e.g. 85° C. The passage through pump (11) and mixer (12) contributes to the emulsification and for example causes large fat globules to be broken up. The emulsion is then given sufficient residence time in pipe (13), e.g. 20 seconds to pasteurize it, and is thereafter cooled down in cooling coil (14) to for example 10° C. The o/w dispersion leaving the cooling coil may contain for example 2% by weight of crystallized fat (calculated on the total product). The dispersion is then fed directly, via a connecting pipe to C-unit (15) wherein kinetic energy is imparted to the dispersion so that phase inversion occurs, and the fat-continuous dispersion emerges from C-unit (15) having a temperature of for example 15° C. and containing for example 4% by weight of solid fat. The dispersion is then fed through C-unit (16) or by-pass (20) and is packed in packing machine (17). During normal functioning of the packing machine, for example 10% of the dispersion is constantly fed by valve (18) into rework line (21). The outer layer of the stream of dispersion is melted by the heating provided on the pipe between valve (18) and static mixer (22) and the dispersion is completely melted and inverted into an o/w emulsion in the heated static mixer (22). The emulsion is then introduced into the main stream of emulsion going from proportioning pump (10) to high-pressure pump (11) by valve (19). If packing machine (17) does not function temporarily, the entire stream of dispersion is fed by means of valve (18) into rework line (21) and the introduction of fresh emulsion from pump (10) is reduced by means of valve (19).

If the fat content of the starting emulsion is very high, e.g. 65% by weight or even higher, it may be desirable to take extra measures to ensure that the starting emulsion has a continuous aqueous phase, even in the case of 100% rework, i.e. if the entire stream of prepared product is fed back through the rework line. For such purposes, suitably an appropriate mixing device, e.g. a C-unit, can be included in the production line, e.g. immediately following the high pressure pump (11).

EXAMPLE 1

A low-calorie spread comprising 40 wt. % continuous fat phase and 60 wt. % dispersed aqueous phase was prepared as follows:

40 parts by weight of a fat phase composition comprising 65 wt. % soyabean oil and 35 wt. % hydrogenated fish oil (having a melting point of 37° C.) and small amounts of emulsifier, vitamins and colouring and flavouring matter was continuously mixed at 50° C. with 60 parts by weight of an aqueous phase composition comprising 1.7 wt. % gelatin, 0.4 wt. % skimmilk powder and small quantities of salt, lactic acid and preservative, the balance consisting of water, by means of a proportioning pump, resulting in an oil-in-water emulsion, at an overall capacity of 3000 kg/h. The emulsion was pasteurized and passed through a static heat exchanger consisting of a cooling coil and a tubular heat exchanger comprising 40 tubular elements. The dispersion leaving the heat-exchanger was then phase-inverted in a C-unit, and the resulting dispersion was further cooled and worked by passage through an A-, a C- and a B-unit prior to packing it. The cooling coil and tubular heat exchanger were cooled with ice-water. The dispersion emerged from the cooling coil having a temperature of 26° C. and from the tubular heat exchanger having a temperature of 11° C. The product emerging from the C-unit in which phase inversion takes place had a solid fat content of 3 wt. %.

The experiment was repeated twice wherein the cooling on the cooling coil was increased and either the first five elements or the last five elements of the tubular heat exchanger were provided with pins, thus making them function as a cooled static mixer. In both cases, the temperature of the dispersion when leaving the cooling coil was 23° C. and when leaving the tubular heat exchanger was 9° C. In all three experiments a suitable product was obtained.

The three experiments described above were repeated using an aqueous phase composition comprising 5 wt. % gelatin, 2 wt. % skimmilk powder, 2.5 wt. % salt, 0.2 wt. % potassium sorbate and citric acid to provide a pH of 5.7, the balance consisting of water. Satisfactory products were obtained in these experiments also.

EXAMPLE 2

A series of experiments (series A) was carried out with a number of different processes to prepare a 40% fat spread, using a commercially sold product as reference. The reference product is conventionally prepared on a production line comprising the sequence CC—A—A—C*—A—C—B—PM, wherein CC indicates a cooling coil and PM indicates a packing machine. The product is prepared via phase inversion, starting with an o/w emulsion, which phase inversion is caused to occur in the C*-unit. The o/w emulsion is prepared by means of a proportioning pump from a fat phase composition containing 60 wt. % soyabean oil, 25 wt. % rapeseed oil and 15 wt. % of a hydrogenated interesterified blend of palm oil and palm kernel oil, and small amounts of the usual additives such as emulsifier, vitamins etc., and an aqueous phase composition comprising 4 wt. % whey, 0.1 wt. % potassium sorbate, 1.2 wt. % gelatin, lactic acid to pH=4.5 and the balance of water, by mixing them in a 4:6 weight ratio. The fat blend constituting the fat phase of the emulsion had the following N-values: $N_{10}=30$; $N_{20}=13$; $N_{30}=3$. The processes employed for the various runs are shown in Table I. The resulting products were evaluated by an expert panel in Table I. The resulting products were evaluated by an expert panel in comparison with the reference product with respect to coarseness of the structure, spreading characteristics, tendency to drop from the knife and occurrence of free moisture. The results are shown in Table II.

The experiments were repeated (series B) using that composition of Example 1 that contains 1.7 wt. % gelatin. The processes used and the results obtained are also shown in Tables I and II, respectively.

The results show that using the process of the present invention does not have an adverse effect on the product properties. Neither of the two reference products is significantly better than any of the products obtained via the present process.

TABLE I

| Sample | | Process |
|---|---|---|
| ref. A | ref. B | - CC - A - A - C* - A - C - B - PM |
| A-2 | B-2 | - CC - C* - A - C - B - PM |
| A-3 | B-3 | - CC - C* - C - B - PM |
| A-4 | | - CC - C* - C - PM |
| A-5 | B-5 | - CC - C* - PM |

TABLE II

| Sample | Coarseness[1] | Spreading[2] | Dropping from knife[3] | Free moisture[4] |
|---|---|---|---|---|
| ref. A | 5 | 2/3 | 6 | 6 |
| A-2 | 7 | 2 | 7 | 5/6 |
| A-3 | 4/5 | 3/4 | 6/7 | 5/6 |
| A-4 | 7/8 | 2 | 7/8 | 6 |
| A-5 | 7/8 | 3 | 7/8 | 6 |
| ref. B | 8 | 2 | 8 | 4/5 |
| B-2 | 7 | 2 | 7 | 5 |
| B-3 | 8/9 | 1/2 | 8/9 | 5 |
| B-5 | 8 | 2/3 | 7 | 5 |

[1]Scale 0–10: 0 indicates coarse, 10 indicates fine
[2]Scale 1–5: 1 indicates excellent, 5 indicates poor
[3]Scale 0–10: 0: Drops from the knife very easily; 10: does not drop from the knife
[4]Scale 0–10: 0 indicates much free moisture, 10 indicates no free moisture.

EXAMPLE 3

The experiment described in Example 2, using the process and composition employed to obtain product B-5, was repeated using apparatus provided with pasteurization equipment and a closed rework line as illustrated in the drawing. The production was continued for 8 hours without problems. No difficulties arose in keeping the process conditions essentially constant. No significant differences occurred between samples taken at different times during the experiment.

EXAMPLE 4

A low-calorie spread comprising 27 wt. % of a continuous fat phase and 73 wt. % of a dispersed aqueous phase was prepared as follows:

27 parts by weight of butterfat containing small amounts of emulsifier, vitamins etc., was mixed with 73 parts by weight of an aqueous phase, comprising 2 wt. % of skim milk powder, 5 wt. % of gelatin, 2 wt. % of salt and 0.2 wt. % of potassium sorbate, having a pH of 5.2.

The mixture was pasteurized and subsequently passed through the same apparatus as used for samples A-5 and B-5 of Example 2. The dispersion emerged from the cooling coil having a temperature of 15° C. and from the inversion unit having a temperature of 21° C. A suitable product was thus obtained.

EXAMPLE 5

A spread having a continuous fat phase and containing 60 wt. % of a fat phase and 40 wt. % of an aqueous phase was prepared as follows:

60 parts by weight of a fat phase comprising 40 wt. % of soybean oil, 55 wt. % of hardened rapeseed oil (melting point 30° C.) and 5 wt. % of hardened palmoil (melting point 44° C.) was mixed with 40 parts of an aqueous phase containing 0.5 wt. % skimmilk powder, 1.5 wt. % gelatin, 0.5 wt. % salt, 0.2 wt. % potassium sorbate and having a pH of 5.0.

The mixture was pasteurized and subsequently passed through the apparatus used to process samples A-5 and B-5 of Example 2. The temperature of the dispersion emerging from the cooling coil was 17° C., the temperature of the dispersion after the inversion unit was 23° C.

The product thus obtained was of a good quality.

I claim:
1. Continuous process for the preparation of an edible plastified dispersion having a continuous fat phase and a dispersed aqueous phase consisting essentially of:
 (i) cooling a constituted emulsion having a continuous aqueous phase and a dispersed fat phase and comprising essentially no solid fat, which emulsion is prepared by admixing at least two different compositions, one comprising a continuous fat phase and the other comprising a continuous aqueous phase, said cooling being achieved by passing said emulsion through a static heat exchanger to cause partial crystallization of fat, the emulsion leaving the heat exchanger as a dispersion having a continuous aqueous phase and containing crystallized fat, and (ii) feeding the dispersion from the step (i) directly to means for imparting kinetic energy so as to invert the dispersion into a dispersion having a continuous fat phase and a dispersed aqueous phase.

2. Process according to claim 1, wherein the emulsion contains gelling agent.

3. Process according to claim 1, wherein the emulsion contains thickening agent.

4. Process according to claim 1, wherein the emulsion entering the static heat exchanger has an average fat globule size of at least 10μ.

5. Process according to claim 1, wherein, in step (i), the emulsion is cooled to a temperature between 0° C. and 20° C.

6. Process according to claim 1, wherein the emulsion comprises from 30 to 88% by weight of aqueous phase and from 70 to 12% by weight of fat phase.

7. Process according to claim 1, wherein the emulsion contains protein.

8. Process according to claim 1, wherein the viscosity of the aqueous phase composition at a shear rate of 100 s$^{-1}$ and a temperature of 20° C. is between 20 and 500 mPas.

9. Process according to claim 8, wherein the N-value of the fat phase composition at 10° C., represented as $N_{10}$, and the viscosity, expressed in mPas, of the aqueous phase composition at a shear rate of 100 s$^{-1}$ and at a temperature of 20° C., represented as V, meet the following requirements:

$V \leq 24 \times N_{10} + 20$
$V \geq 7 \times N_{10} - 190$
$10 \leq N_{10} \leq 55$.

10. Process according to claim 1, wherein, after step (ii), the dispersion contains at least 0.5% by weight of solid fat.

11. Process according to claim 1, wherein, after step (ii), the dispersion has a temperature between 10°0 and 23° C.

12. Process according to claim 1, wherein the static heat exchanger used in step (i) is a tubular heat exchanger.

13. Process according to claim 1, wherein in step (ii) the kinetic energy imparted to the dispersion is at least 5 kJ/kg.

14. Process according to claim 13, wherein the kinetic energy imparted to the dispersion is 10–150 kJ/kg.

15. Process according to claim 14, wherein the kinetic energy is imparted by passing the dispersion through a stirred crystallizer.

16. Process according to claim 1, wherein the average linear velocity in the static heat exchanger is between 0.2 and 2.0 m/s.

17. Process according to claim 1, wherein the hardness of the product upon packaging as represented by the C-value is less than 250.

18. Process according to claim 1, wherein the composition constituting the emulsion prior to the cooling in step (i), is heated by passing it through a static mixer provided with heating means, the composition being heated to a temperature sufficiently high, and being kept at such temperature sufficiently long for it to be pasteurized.

19. Process according to claim 1, wherein at least in part, the dispersion available for packing is passed through a closed rework path which includes a static mixer provided with heating means, wherein the dispersion is heated to cause melting of the dispersion and inversion thereof into an emulsion having a continuous aqueous phase and a dispersed fat phase.

* * * * *